United States Patent [19]

(12) United States Patent
Garthwaite et al.

(10) Patent No.: US 9,189,419 B2
(45) Date of Patent: Nov. 17, 2015

(54) DETECTING AND SUPPRESSING REDUNDANT INPUT-OUTPUT OPERATIONS

(75) Inventors: Alexander Thomas Garthwaite, Beverly, MA (US); Maxime Austruy, Sainte-Sulpice (CH); Kapil Arya, Boston, MA (US)

(73) Assignee: VMware, Inc., Palo Alto, CA (US)

( * ) Notice: Subject to any disclaimer, the term of this patent is extended or adjusted under 35 U.S.C. 154(b) by 275 days.

(21) Appl. No.: 13/448,291

(22) Filed: Apr. 16, 2012

(65) Prior Publication Data

US 2012/0324181 A1 Dec. 20, 2012

Related U.S. Application Data

(60) Provisional application No. 61/475,607, filed on Apr. 14, 2011.

(51) Int. Cl.
G06F 13/20 (2006.01)
G06F 7/00 (2006.01)
G06F 7/20 (2006.01)
G06F 12/10 (2006.01)

(52) U.S. Cl.
CPC .......... *G06F 12/109* (2013.01); *G06F 12/1081* (2013.01); *G06F 2212/657* (2013.01)

(58) Field of Classification Search
CPC ............... G06F 12/0246; G06F 2212/7201; G06F 2212/7202; G06F 21/79; G06F 12/109; G06F 3/0604; G06F 2009/45579; G06F 3/061; G06F 2212/152; G06F 3/0641; G06F 17/30156

See application file for complete search history.

(56) References Cited

U.S. PATENT DOCUMENTS

| 5,694,571 A | * | 12/1997 | Fuller | 711/113 |
| 2008/0065825 A1 | * | 3/2008 | Fang et al. | 711/112 |
| 2010/0299667 A1 | * | 11/2010 | Ahmad et al. | 718/1 |
| 2011/0161620 A1 | * | 6/2011 | Kaminski et al. | 711/207 |

* cited by examiner

*Primary Examiner* — Cheng-Yuan Tseng
*Assistant Examiner* — Candice Rankin

(57) ABSTRACT

In a virtual machine, swap activities of a hypervisor and a guest OS are reconciled so that redundant input-output operations (IOs) can be avoided and a synchronous response time of the virtual machine improved. This is achieved with a map of memory pages to blocks of storage. For a write IO to write contents of a memory page into a target block, the map is examined to see if it contains a valid entry for the memory page. If the map contains the valid entry, the write IO is prevented from being issued and a data structure is updated so that subsequent IOs to the target block is redirected from the target block to a block that is associated with the physical memory page in the valid entry. On the other hand, if the map does not contain the valid entry, the write IO is issued.

24 Claims, 5 Drawing Sheets

DETECTING AND SUPPRESSING REDUNDANT INPUT-OUTPUT OPERATIONS

CROSS-REFERENCE TO RELATED APPLICATIONS

This application claims the benefit of U.S. Provisional Patent Application Ser. No. 61/475,607, filed Apr. 14, 2011, entitled "Reconciling Guest and Virtual Machine Monitor (VMM) Swapping in a Virtual Machine," the entire contents of which are incorporated by reference herein.

BACKGROUND

Virtual computing environments allow multiple virtual machines (VMs) to be run on a single physical platform ("host") and to share physical resources. Some virtual computing environments allow configuring the VMs in a way where the total amount of memory designated for use by the VMs is bigger than the actual amount of memory available on the host. This is referred to as memory over-commitment, and it allows packing more VMs onto a single host.

Each VM has a guest operating system (OS) that allocates the physical address space of the VM, which is divided into addressable physical page numbers (referred to herein as "guest physical page numbers"), to applications and devices running in the VM. Each such application or device is allocated a virtual address space, which is divided into addressable virtual page numbers (referred to herein as "guest virtual page numbers"), each of which may have a mapping to a guest physical page number or to a location on a virtual disk of the VM known as a swap space. The use of the virtual address space allows the guest OS to provide a contiguous address space and also to over-commit the guest physical memory, which may cause swapping out of guest physical pages to allow them to be repurposed between applications and devices running the VM.

Just as a guest OS maps guest virtual page numbers to guest physical page numbers, a virtualization software layer running in the host, commonly known as and referred to herein as a hypervisor, maps the guest physical address space of each VM to the host physical memory space (also referred to as "machine memory space"), which is divided into addressable host physical page numbers (referred to herein as "machine page numbers"). Over-commitment of the machine memory may lead to swapping out of machine pages to a swap space managed by the hypervisor to allow them to repurposed between VMs running in the host.

When both the guest OS and the hypervisor have over-committed their respective physical memory, a problem known in the art as "double swapping" may occur. This problem is encountered when the hypervisor swaps out a machine page to its swap space and the guest OS subsequently attempts to swap out a guest physical page that is mapped to the swapped-out machine page. When the guest OS attempts to swap out a guest physical page that is mapped to the hypervisor swapped-out machine page, the hypervisor swapped-out machine page is read back into memory from the swap space of the hypervisor, only to be swapped out once more to a swap space on the virtual disk that is managed by the guest OS. This sequence of events has several costs: (1) allocation of a machine page for swapping in the hypervisor swapped-out machine page when the host is presumably under memory pressure; (2) swapping in data that is already stored persistently, only to be swapped out once more to persistent storage; and (3) unexpected latency experienced by the VM.

SUMMARY

One or more embodiments of the present invention provide a technique to reconcile the swap activities of the hypervisor and the guest OS so that redundant input-output operations (IOs) can be avoided and the synchronous response time of the VM improved. In addition, the technique reduces the number of machine pages that are allocated when the host is under memory pressure.

The technique according to one embodiment is a method of detecting and suppressing redundant IOs to persistent storage that includes the step of maintaining a map of physical memory pages (which may be either guest physical memory pages or host physical memory pages) to blocks of persistent storage. For a write IO to write contents of a physical memory page into a target block in persistent storage, the map is examined to see if it contains a valid entry for the physical memory page. If the map contains the valid entry, the write IO is prevented from being issued and a data structure is updated so that subsequent IOs to the target block is redirected from the target block to a block that is associated with the physical memory page in the valid entry. On the other hand, if the map does not contain the valid entry, the write IO is issued, and responsive to a completion of the write IO, the map is updated to add a new entry that associates the physical memory page to the target block.

Further embodiments of the present invention include, without limitation, a non-transitory computer-readable storage medium that includes instructions that enable a computer system to implement one or more aspects of the above method as well as a computer system configured to implement one or more aspects of the above method.

DETAILED DESCRIPTION

Figure 1:
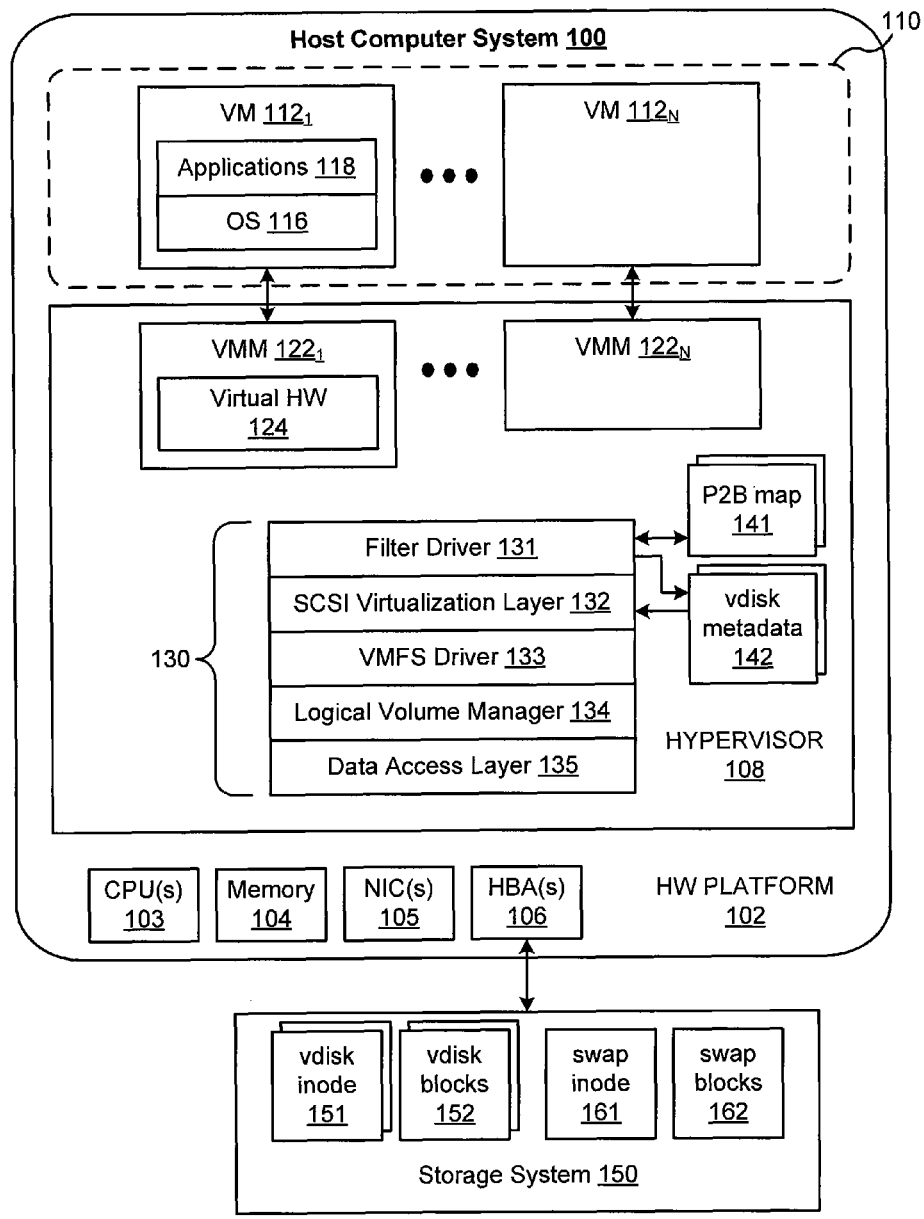
FIG. 1 is a schematic diagram that illustrates a virtualized computer system that is configured to carry out one or more embodiment of the present invention.

FIG. 1 is a schematic diagram that illustrates a virtualized computer system that is configured to carry out one or more embodiment of the present invention. The virtualized computer system is implemented in a host computer system 100 which may be constructed on a conventional, typically server-class, hardware platform 102. Hardware platform 102 includes one or more central processing units (CPUs) 103, system memory 104, also referred to herein as "machine memory," one or more network interface controllers (NICs) 105 that connect host computer 100 to a network, and one or more host bus adapters (HBAs) 106 that connect host computer 102 to a persistent storage unit, illustrated herein as storage system 150. Alternatively, persistent storage may be provided locally in host computer 100 or through the network by a networked-attached storage system.

As further shown in FIG. 1, hypervisor 108 is installed on top of hardware platform 102 and supports a virtual machine execution space 110 within which multiple virtual machines (VMs) 112$_1$-112$_N$ may be concurrently instantiated and executed. Each such virtual machine implements a virtual hardware platform that supports the installation of a guest operating system (OS) which is capable of executing applications. In the example illustrated in FIG. 1, virtual HW 124 for VM 112$_1$ supports the installation of a guest OS 116 which is capable of executing applications 118 within VM 112$_1$. Guest OS 116 may be any of the well-known commodity operating systems, such as Microsoft Windows®, Linux®, and the like, and includes a native file system layer, for example, either an NTFS or an ext3FS type file system layer. IOs issued by guest OS 116 through the native file system layer appear to guest OS 116 as being routed to one or more virtual disks provisioned for VM 112$_1$ for final execution, but such IOs are, in reality, reprocessed by IO stack 130 of hypervisor 108 and the reprocessed IOs are issued through HBA 106 to storage system 150.

At the top of IO stack 130 is a filter driver 131 which may examine and populate data structures that are provisioned in the embodiment described herein. The first of these data structures, shown as P2B map 141, is a map, provisioned per VM, that identifies those guest physical memory pages of the VM whose contents are also stored in storage blocks of the corresponding virtual disk (shown as vdisk blocks 152) or storage blocks of a swap file managed by hypervisor 108 (shown as swap blocks 162), and for each such memory page, provides a mapping to the particular storage block that has the same contents stored therein. It should be recognized that more than one guest physical memory page may map to the same storage block. It should also be recognized that storage blocks of the virtual disk are contained in storage system 150 because the virtual disk may be represented (and is so represented in the embodiment described herein) as one or more files stored in storage system 150.

The second of the data structures, shown as vdisk metadata 142, is also provisioned per VM and stores metadata for the VM's virtual disk. This data structure identifies those storage blocks of the VM's virtual disk that reference other storage blocks of the VM's virtual disk or storage blocks of the swap file managed by hypervisor 108 for content. For example, if a read IO is issued by a VM to read in the contents of storage block B0 into page P0 and vdisk metadata 142 indicates that storage block B0 references storage block B1 for content, the read IO will be redirected from storage block B0 to storage block B1.

SCSI virtualization layer 132 receives IOs directed at the VM's virtual disk and translates them into file IOs directed at one or more files managed by hypervisor 150, e.g., virtual disk files representing the VM's virtual disk. SCSI virtualization layer 132 also accesses vdisk metadata 142 to determine if any IOs should be redirected. In the example given above, any IOs directed at storage block B0 would be redirected to storage block B1. As described above, storage block B1 may be one of the storage blocks of the VM's virtual disk or one of storage blocks of the swap file managed by hypervisor 108. In the case where storage block B1 is one of the storage blocks of the VM's virtual disk, SCSI virtualization layer 132 translates IOs directed at the VM's virtual disk to file IOs directed at the virtual disk files representing the VM's virtual disk. In the case where storage block B1 is one of the storage blocks of the swap file managed by hypervisor 108, SCSI virtualization layer 132 translates IOs directed at the VM's virtual disk to file IOs directed at the virtual disk files representing the VM's virtual disk and file IOs directed at the swap file.

The remaining layers of IO stack 130 are additional layers managed by hypervisor 108 to implement a clustered file system, referred to herein as virtual machine file system (VMFS), one example of which is described in U.S. Pat. No. 7,849,098, the entire contents of which are incorporated by reference herein. VMFS driver 133, converts the file IOs received from SCSI virtualization layer 132 to volume block IOs that are provided to logical volume manager (LVM) 134. LVM 134 generates raw SCSI commands from the volume block IOs and provides them to data access layer 135. Data access layer 135 includes a device access layer, which discovers storage system 150, and applies command queuing and scheduling policies to the raw SCSI commands, and a device driver, which understands the input/output interface of HBAs 106 interfacing with storage system 150, and sends the raw SCSI commands to HBAs 106 to be forwarded to storage system 150.

It should be recognized that the various terms, layers and categorizations used to describe the virtualization components in FIG. 1 may be referred to differently without departing from their functionality or the spirit or scope of the invention. For example, VMMs 122 may be considered separate virtualization components between VMs 112 and hypervisor 108 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. It should also be recognized that the techniques described herein are also applicable to hosted virtualized computer systems. Furthermore, although benefits that are achieved may be different, the techniques described herein may be applied to certain non-virtualized computer systems.

Storage system 150 includes a storage system manager (not shown) that implements the VMFS according to which virtual disk files for VMs 112 and a swap for hypervisor 108 are stored. Each file in the VMFS has a file descriptor, referred to herein as an "inode," stored therewith. In FIG. 1, the inode and the storage blocks of one representative virtual disk file are illustrated as vdisk inode 151 and vdisk blocks 152, respectively. In addition, the inode and the storage blocks of the hypervisor swap file are illustrated as swap inode 161 and swap blocks 162, respectively. The inode for a file contains metadata about the file such as file attributes and pointers to the storage blocks of the file. In the embodiments of the invention described herein, the inode also includes a reference count for each of the storage blocks of the file. This reference count is set as for free storage blocks, and changed to 1 when the storage block is written to. Each time vdisk metadata 142 for one of the VMs is updated to add a reference to a used storage block, the reference count associated with the storage block is incremented by one. Conversely, each time vdisk metadata 142 for one of the VMs is updated to remove a reference to a storage block, the reference count associated with the storage block is decremented by one. When a storage block has a reference count greater than one, this signifies that the storage block is being shared and the storage block will be treated as read-only. Any write IOs targeting a read-only storage block will be made to a different, free storage block, and the reference count of the read-only storage block will be decremented by one. Write IOs to a storage block having a reference count of 1, on the other hand, will be performed in-place (i.e., the current contents of the storage block will be overwritten with the new contents).

Figure 2:
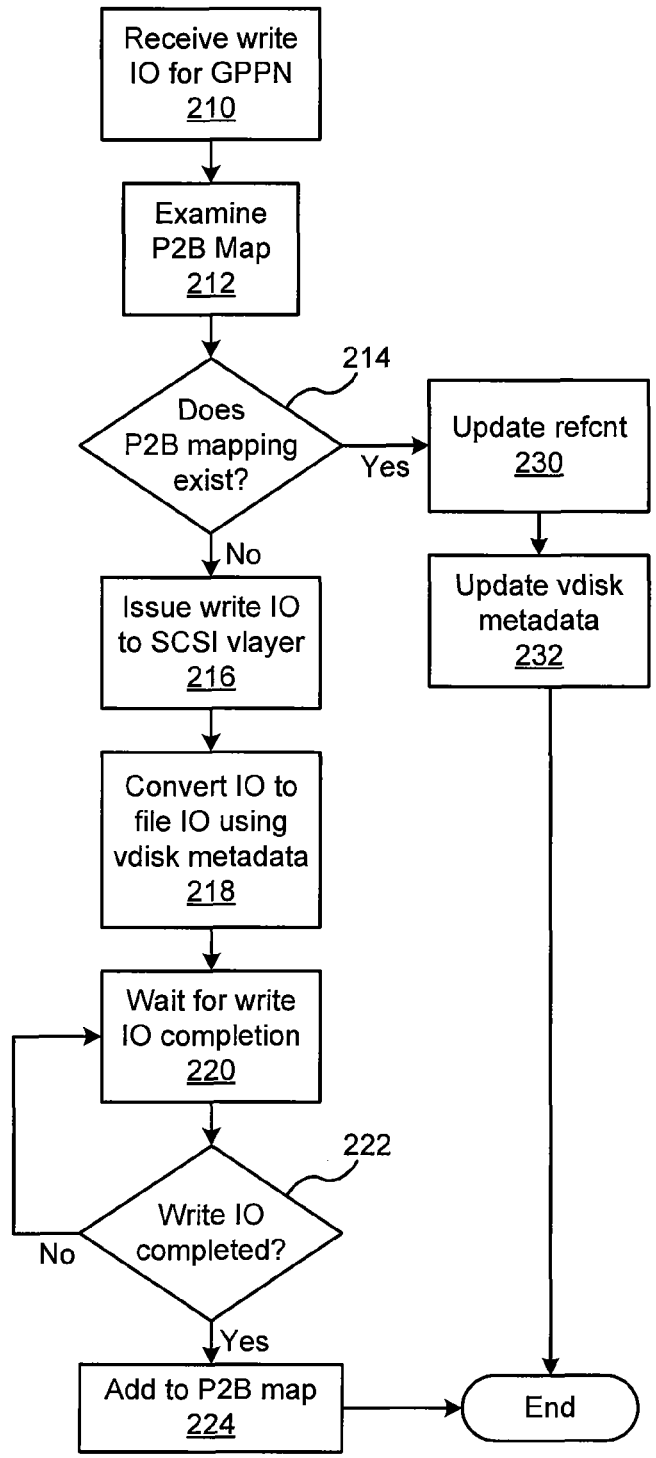
FIG. 2 is a flow diagram that illustrates a method for performing a write IO according to an embodiment.

FIG. 2 is a flow diagram that illustrates a method for performing a write IO according to an embodiment. The steps of the method according to this embodiment are carried out by filter driver 131 and SCSI virtualization layer 132 of host computer system 100 in response to a virtual write IO issued by a VM.

At step 210, filter driver 131 receives the virtual write IO (e.g., a request to write the contents of a guest physical memory page of a particular VM having a page number, GPPN, to a storage block of the VM's virtual disk having a block number, BN). At step 212, P2B map 141 is examined to see if there is an entry for GPPN and the entry is valid. The entry may no longer be valid if the page has been modified since being added to P2B map 141. In one embodiment, to keep track of the validity of an entry, a valid bit is included in P2B map 141, the valid bit being set if the corresponding entry is valid and the valid bit being cleared if the corresponding entry is not valid. If it is determined at step 214 that P2B map 141 contains a valid P2B mapping for GPPN, step 230 is executed. At step 230, a reference count associated with the storage block to which GPPN is mapped, hereinafter referred to as BX, is incremented by one. At step 232, vdisk metadata 142 is updated to indicate that storage block, BN, of the VM's virtual disk, is referencing storage block BX for content. In some embodiments, the reference counts for vdisk blocks 152 and swap blocks 162 are cached in memory 104 and flushed to storage system 150 on a periodic basis with other metadata of the virtual disk file and the swap file.

If it is determined at step 214 that P2B map 141 does not contain a valid P2B mapping for GPPN, step 216 is executed where filter driver 131 issues the write IO to SCSI virtualization layer 132. At step 218, SCSI virtualization layer 132 translates the write IO into a file IO directed at one or more files managed by hypervisor 150. As part of this step, SCSI virtualization layer 132 also accesses vdisk metadata 142 to redirect any of the targets of the write IO. At steps 220 and 222, SCSI virtualization layer 132 waits for acknowledgement of write completion. When the acknowledgement is received, step 224 is executed. At step 224, P2B map 141 is updated with a new P2B mapping from GPPN to the block number of the storage block identified in the acknowledgement. It should be recognized that if the write 10 was issued to a read-only block, the storage block identified in the acknowledgement and the storage block number recorded in P2B map 141 would be different from storage block targeted in the write 10.

Figure 3:
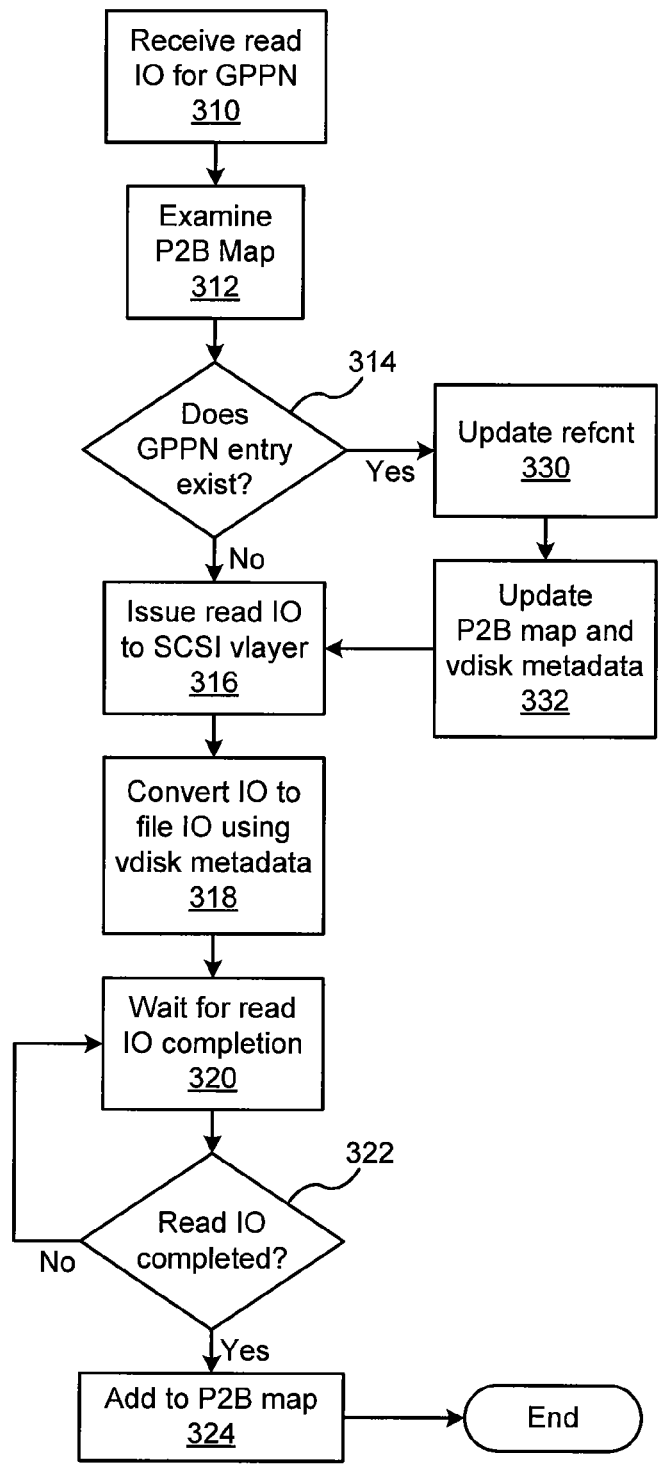
FIG. 3 is a flow diagram that illustrates a method for performing a read IO according to an embodiment.

FIG. 3 is a flow diagram that illustrates a method for performing a read IO according to an embodiment. The steps of the method according to this embodiment are carried out by filter driver 131 and SCSI virtualization layer 132 of host computer system 100 in response to a virtual read IO issued by a VM.

At step 310, filter driver 131 receives the virtual read IO (e.g., a request to read the contents of a storage block of a particular VM's virtual disk having a block number, BN, into a guest physical memory page of the VM having a page number, GPPN). At step 312, P2B map 141 is examined to see if there is an entry for GPPN. If it is determined at step 314 that P2B map 141 contains an entry for GPPN, step 330 is executed. At step 330, a reference count associated with the storage block to which GPPN is mapped is decremented by one. At step 332, P2B map 141 and vdisk metadata 142 are updated to remove any entries for GPPN. In some embodiments, the reference counts for vdisk blocks 152 and swap blocks 162 are cached in memory 104 and flushed to storage system 150 on a periodic basis with other metadata of the virtual disk file and the swap file. The flow then proceeds to step 316.

At step 316, which is also executed directly following step 314, if it is determined at step 314 that P2B map 141 does not contain an entry for GPPN, filter driver 131 issues the read IO to SCSI virtualization layer 132. At step 318, SCSI virtualization layer 132 translates the read IO into a file IO directed at one or more files managed by hypervisor 150. As part of this step, SCSI virtualization layer 132 also accesses vdisk metadata 142 to redirect any targets of the read 10. At steps 320 and 322, SCSI virtualization layer 132 waits for read completion, i.e., read data being returned from storage system 150. When the read has completed, step 324 is executed. At step 324, P2B map 141 is updated with a new P2B mapping from GPPN to the block number targeted in the read IO.

For clarity of understanding, the read and write IOs are described above as being issued for a single memory page. However, the concepts described above for IOs issued for a single memory page apply just as well to IOs issued for multiple memory pages, such as when scatter-gather lists are used. For example, during an IO to write memory pages {p1, p13, p14, p37, p42} respectively to a contiguous set of storage blocks {B12, B13, B14, B15, B16}, for which P2B mapping exists for p1, p14, and p42, the IO would be issued as an IO to write memory pages {p13, dummy page, p37} respectively to a contiguous set of storage blocks {B13, B14, B15}, where the dummy page may be a page of zeroes.

Figure 4:
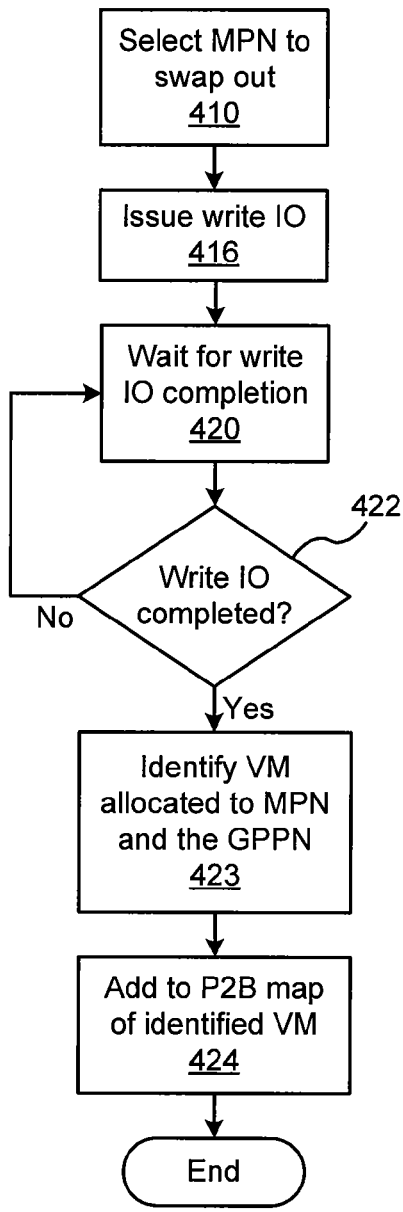
FIG. 4 is a flow diagram that illustrates a method for updating a data structure that is used in the methods illustrated in FIGS. 2-3 during a page swap out.

FIG. 4 is a flow diagram that illustrates a method for updating a data structure that is used in the methods illustrated in FIGS. 2-3 during a page swap out. At step 410, hypervisor 108 selects a machine memory page having a page number, MPN, to swap out. The selection may be done according to any well-known technique. Then at step 216, hypervisor issues a write IO to write the contents of the selected machine memory page to a storage block of the swap file it is managing. At steps 420 and 422, hypervisor 108 waits for acknowledgement of write completion. When the acknowledgement is received, step 423 is executed. At step 423, hypervisor 108 identifies the particular VM that has been allocated the machine memory page that was swapped out and the GPPN that was mapped to MPN. Then, at step 424, the P2B map of the VM identified in step 423 is updated with a new P2B mapping from GPPN to the block number of the storage block identified in the acknowledgement. It should be recognized that if the write IO was issued to a read-only block, the storage block identified in the acknowledgement and the storage block number recorded in the P2B map would be different from storage block targeted in the write IO.

It should be recognized that there may be other hypervisor IOs that would result in the updating of P2B map. For example, a hypervisor read IO that causes contents of a storage block to be loaded into a machine memory page would result in an update to the P2B map for a guest that has one of its guest physical memory pages mapped to such machine memory page.

Figure 5:
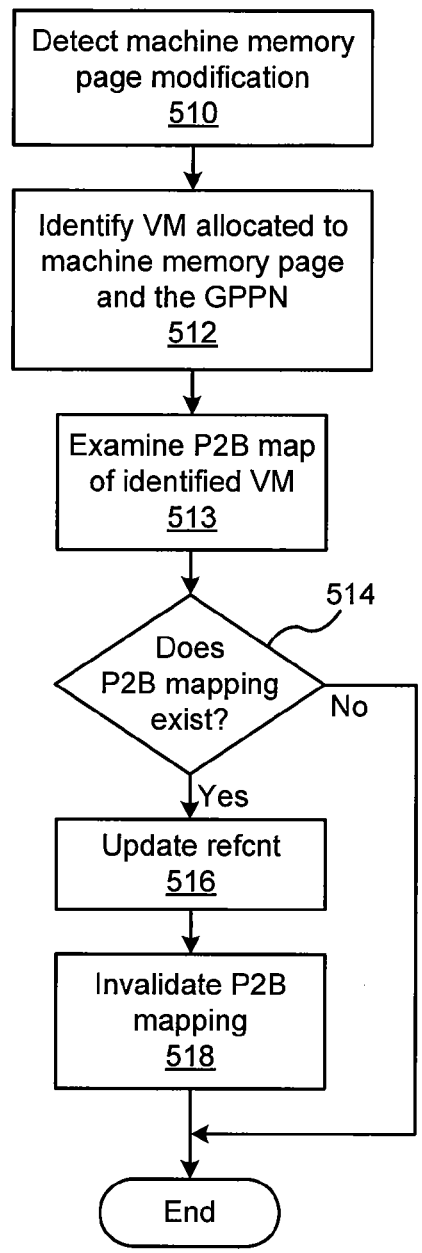
FIG. 5 is a flow diagram that illustrates a method for updating a data structure that is used in the methods illustrated in FIGS. 2-3 during a page modification in memory.

FIG. 5 is a flow diagram that illustrates a method for updating a data structure that is used in the methods illustrated in FIGS. 2-3 during a page modification in memory. This method begins at step 510 with a detection of machine memory page modification by hypervisor 108. In one embodiment, the detection may be triggered by write traces being placed on machine memory pages. Other embodiments include (1) explicit checks by hypervisor 108 when a modification is known to have happened (e.g., when hypervisor 108 on behalf of some guest operation performs a page-table walk that sets accessed/dirty bits in the walked page table entries), or (2) hypervisor 108 mapping known clean memory pages of the guest as being read-only so that it can detect when the guest writes to such memory pages. At step 513, hypervisor 108 identifies the particular VM that has been allocated the machine memory page that has been modified and the GPPN that was mapped to the modified machine memory page. Then, at step 514, the P2B map of the identified VM is examined to see if there is an entry for GPPN. If it is determined at step 514 that the P2B map contains an entry for GPPN, step 516 is executed. At step 516, an IO is issued to cause a reference count associated with the storage block to which GPPN is mapped to be decremented by one. At step 518, the P2B map is updated to invalidate the entry for GPPN. The method terminates after step 518 or if it is determined at step 514 that the P2B map does not contain an entry for GPPN.

It should be recognized that the methods described above prevent the double swapping problem in the following manner. First, the hypervisor is able to recognize through the P2B map that a storage block already has the contents of a guest physical memory page that the guest OS has chosen to swap out and has issued a write IO to do so. Then, with this recognition, the hypervisor simply modifies a data structure that tracks storage block mappings of the guest's virtual disk so that the storage block that the guest OS targeted for swapping out will reference (i.e., have a pointer to) the storage block that already has the contents of the guest memory page to be swapped out. In the case where the write IO is issued for a single memory page, no IOs are issued by the hypervisor in response thereto. In the case where the write IO is issued from a scatter-gather list for multiple memory pages, the number IOs issued by the hypervisor in response thereto may be reduced.

It should also be recognized that the methods described above allow for prevention of duplicate storage blocks in situations where the same page in memory is to be copied to different storage blocks of a VM's virtual disk. With the methods described above, the hypervisor allows the first write IO to be issued but filters subsequent write IOs according to mappings stored in the P2B map. Instead of issuing the subsequent write IOs, the hypervisor simply modifies a data structure that tracks of storage block mappings of the VM's virtual disk so that the storage blocks that are targets for the subsequent write IOs will reference (i.e., have a pointer to) the storage block that is the target for the first write IO and that already has the contents of the memory page to be copied.

Consequently, the techniques described herein may reduce the number of IOs in each of the following cases: (1) IOs issued by the guest as a result of prior read/write IOs by the guest, (2) IOs issued by the guest as a result of prior write IOs by the hypervisor, (3) IOs issued by the hypervisor as a result of prior write IOs by the hypervisor, and (4) IOs issued by the hypervisor as a result of prior write IOs by the guest.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method of detecting and suppressing redundant input/output operations (IOs) to persistent storage, comprising:
maintaining a map of physical memory pages to blocks of persistent storage;
for a write IO to write contents of a physical memory page into a target block in persistent storage, examining if the map contains an entry for the physical memory page and an indication that the entry is valid;
if the map contains the valid entry, wherein the valid entry associates the physical memory page with a mapped block in the persistent storage and indicates that both the physical memory page and the mapped block in persistent storage have the same contents, preventing the write IO from being issued and updating a data structure to redirect subsequent IOs to the target block to the mapped block; and
if the map does not contain the valid entry, issuing the write IO.

2. The method of claim 1, further comprising:
in a case where the map does not contain the valid entry, responsive to a completion of the write IO, updating the map by adding a new entry that associates the physical memory page with the target block.

3. The method of claim 2, further comprising:
updating a reference count that is maintained for the target block when the map is updated, wherein the reference count determines whether the target block is a read-only block.

4. The method of claim 1, further comprising:
in a case where the map contains the valid entry,
updating a reference count that is maintained for the mapped block when the data structure is updated, wherein the reference count determines whether the target block is a read-only block.

5. The method of claim 1, further comprising:
invalidating an entry for a physical memory page in the map responsive to a detection of a modification to the physical memory page.

6. The method of claim 1, further comprising:
for a read IO to read contents from a source block in the persistent storage into a target physical memory page, updating the map by including a new entry that associates the target physical memory page with the source block.

7. The method of claim 6, further comprising:
issuing the read IO;
wherein the updating of the map is responsive to a completion of the read IO.

8. The method of claim 7, further comprising:
prior to said issuing the read IO, examining if the map contains an existing entry for the target physical memory page, and removing or invalidating the existing entry.

9. The method of claim 8, further comprising:
updating a reference count that is maintained for a block that is identified by the existing entry as being associated with the target physical memory page.

10. The method of claim 1, wherein
the physical memory pages are guest physical memory pages of a virtual machine that is running on top of a virtualization software layer, and
the virtualization software maintains a swap file for use as a swap space for machine memory pages, and a virtual disk file for use as a virtual disk for the virtual machine.

11. The method of claim 10, wherein the mapped block is a block of the swap file, and the data structure is updated to provide a mapping from the target block to the mapped block.

12. The method of claim 10, wherein the mapped block is a block of the virtual disk file, and the data structure is updated to provide a mapping from the target block to the mapped block.

13. The method of claim 10, wherein the write IO is issued by the virtual machine and the mapped block is a block of the virtual disk file.

14. The method of claim 10, wherein the write IO is issued by the virtual machine and the mapped block is a block of the swap file.

15. The method of claim 10, wherein the write IO is issued by the virtualization software and the mapped block is a block of the virtual disk file.

16. The method of claim 10, wherein the write IO is issued by the virtualization software and the mapped block is a block of the swap file.

17. A virtualized computer system having virtual machines running therein, a virtualization layer supporting execution of the virtual machines, and a persistent storage in which virtual disk files for the virtual machines and a swap file that is common to the virtual machines are stored, wherein the virtualization layer is configured to carry out a method of detecting and suppressing redundant input/output operations (IOs) to the persistent storage, said method comprising:
for each of the virtual machines, maintaining a map of guest physical memory pages to blocks in the persistent storage;
for a write IO to write contents of a guest physical memory page into a target block in the persistent storage, examining if one of the maps contains an entry for the guest physical memory page and an indication that the entry is valid;
if a valid entry is contained in one of the maps, wherein the valid entry associates the guest physical memory page with a mapped block in the persistent storage and indicates that both the physical memory page and the mapped block in persistent storage have the same contents, preventing the write IO from being issued and updating a data structure to redirect subsequent IOs to the target block to the mapped block; and
if the valid entry is not contained in one of the maps, issuing the write IO.

18. The system of claim 17, wherein the mapped block is a block of the swap file, and the data structure is updated to provide a mapping from the target block to the mapped block.

19. The system of claim 17, wherein the mapped block is a block of one of the virtual disk files, and the data structure is updated to provide a mapping from the target block to the mapped block.

20. The system of claim 17, wherein the method further comprises:
for a read IO to read contents from a source block in the persistent storage into a target guest physical memory page, updating one of the maps by including a new entry that associates the target guest physical memory page with the source block.

21. The system of claim 20, wherein the method further comprises:
issuing the read IO,
wherein the updating of one of the maps is responsive to a completion of the read IO.

22. The system of claim 21, wherein the method further comprises:
prior to said issuing the read IO, examining if said one of the maps contains an existing entry for the target guest physical memory page, and removing or invalidating the existing entry.

23. A non-transitory computer readable storage medium comprising instructions to be executed in a computer system having virtual machines running therein to cause the computer system to carry out a method of detecting and suppressing redundant input/output operations (IOs) to persistent storage, the method comprising:

for each of the virtual machines, maintaining a map of guest physical memory pages to blocks in the persistent storage;

for a write IO to write contents of a guest physical memory page into a target block in the persistent storage examining if one of the maps contains an entry for the guest physical memory page and an indication that the entry is valid;

if a valid entry is contained in one of the maps, wherein the valid entry associates the guest physical memory page with a mapped block in the persistent storage and indicates that both the physical memory page and the mapped block in persistent storage have the same contents, preventing the write IO from being issued and updating a data structure to redirect subsequent IOs to the target block to the mapped block; and if the valid entry is not contained in one of the maps, issuing the write IO.

24. The non-transitory computer readable storage medium of claim 23, wherein the method further comprises:

for a read IO to read contents from a source block in the persistent storage into a target guest physical memory page, examining if one of the maps contains an existing entry for the target guest physical memory page;

if one of the maps contains the existing entry, removing or invalidating the existing entry from said one of the maps; and if none of the maps contains the existing entry, updating one of the maps to include a new entry that associates the target guest physical memory page with the source block.

* * * * *